United States Patent
Moll et al.

(10) Patent No.: US 11,922,096 B1
(45) Date of Patent: Mar. 5, 2024

(54) VOICE CONTROLLED UIS FOR AR WEARABLE DEVICES

(71) Applicant: Snap Inc., Santa Monica, CA (US)

(72) Inventors: Sharon Moll, Lachen (CH); Piotr Gurgul, Hergiswil (CH)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/823,169

(22) Filed: Aug. 30, 2022

(51) Int. Cl.
| | | |
|---|---|---|
| *G06F 3/16* | (2006.01) |
| *G06F 3/04817* | (2022.01) |
| *G06F 3/0484* | (2022.01) |
| *G10L 15/16* | (2006.01) |
| *G10L 15/22* | (2006.01) |

(52) U.S. Cl.
CPC .......... *G06F 3/167* (2013.01); *G06F 3/04817* (2013.01); *G06F 3/0484* (2013.01); *G10L 15/16* (2013.01); *G10L 15/22* (2013.01); *G10L 2015/223* (2013.01)

(58) Field of Classification Search
CPC .... G06F 3/167; G06F 3/04817; G06F 3/0484; G10L 15/16; G10L 15/22; G10L 2015/223
See application file for complete search history.

(56) References Cited

U.S. PATENT DOCUMENTS

| | | |
|---|---|---|
| 9,135,914 B1 | 9/2015 | Bringert et al. |
| 10,157,042 B1 * | 12/2018 | Jayakumar ............. H04R 27/00 |
| 2003/0156130 A1 * | 8/2003 | James ..................... G06F 3/167 |
| | | 715/728 |
| 2013/0173270 A1 | 7/2013 | Han et al. |
| 2013/0288753 A1 * | 10/2013 | Jacobsen ......... H04M 1/724097 |
| | | 455/563 |
| 2014/0196087 A1 | 7/2014 | Park et al. |
| 2015/0199017 A1 * | 7/2015 | Murillo ................. G06F 3/0304 |
| | | 345/156 |
| 2016/0225371 A1 * | 8/2016 | Agrawal ............. G06F 3/04842 |
| 2018/0286402 A1 | 10/2018 | Lebeau et al. |
| 2019/0103109 A1 * | 4/2019 | Du .......................... G06F 3/167 |
| 2022/0093098 A1 * | 3/2022 | Samal ..................... G06F 3/167 |

OTHER PUBLICATIONS

"International Application Serial No. PCT US2023 031018, International Search Report dated Dec. 13, 2023", 3 pgs.
"International Application Serial No. PCT US2023 031018, Written Opinion dated Dec. 13, 2023", 4 pgs.

* cited by examiner

*Primary Examiner* — Daniel Samwel
(74) *Attorney, Agent, or Firm* — Schwegman Lundberg & Woessner, P.A.

(57) ABSTRACT

Systems, methods, and computer readable media for voice-controlled user interfaces (UIs) for augmented reality (AR) wearable devices are disclosed. Embodiments are disclosed that enable a user to interact with the AR wearable device without using physical user interface devices. An application has a non-voice-controlled UI mode and a voice-controlled UI mode. The user selects the mode of the UI. The application running on the AR wearable device displays UI elements on a display of the AR wearable device. The UI elements have types. Predetermined actions are associated with each of the UI element types. The predetermined actions are displayed with other information and used by the user to invoke the corresponding UI element.

18 Claims, 16 Drawing Sheets

VOICE CONTROLLED UIS FOR AR WEARABLE DEVICES

TECHNICAL FIELD

Examples of the present disclosure relate generally to voice input for augmented reality (AR) wearable devices. More particularly, but not by way of limitation, examples of the present disclosure relate to voice input for invoking user interface (UI) elements by using predetermined actions that are associated with a type of the UI element.

BACKGROUND

Users increasingly want virtual reality (VR), mixed reality (MR), and augmented reality (AR) wearable devices to operate in a more user-friendly manner. However, often, the wearable devices have very little room for interface controls on the wearable devices.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
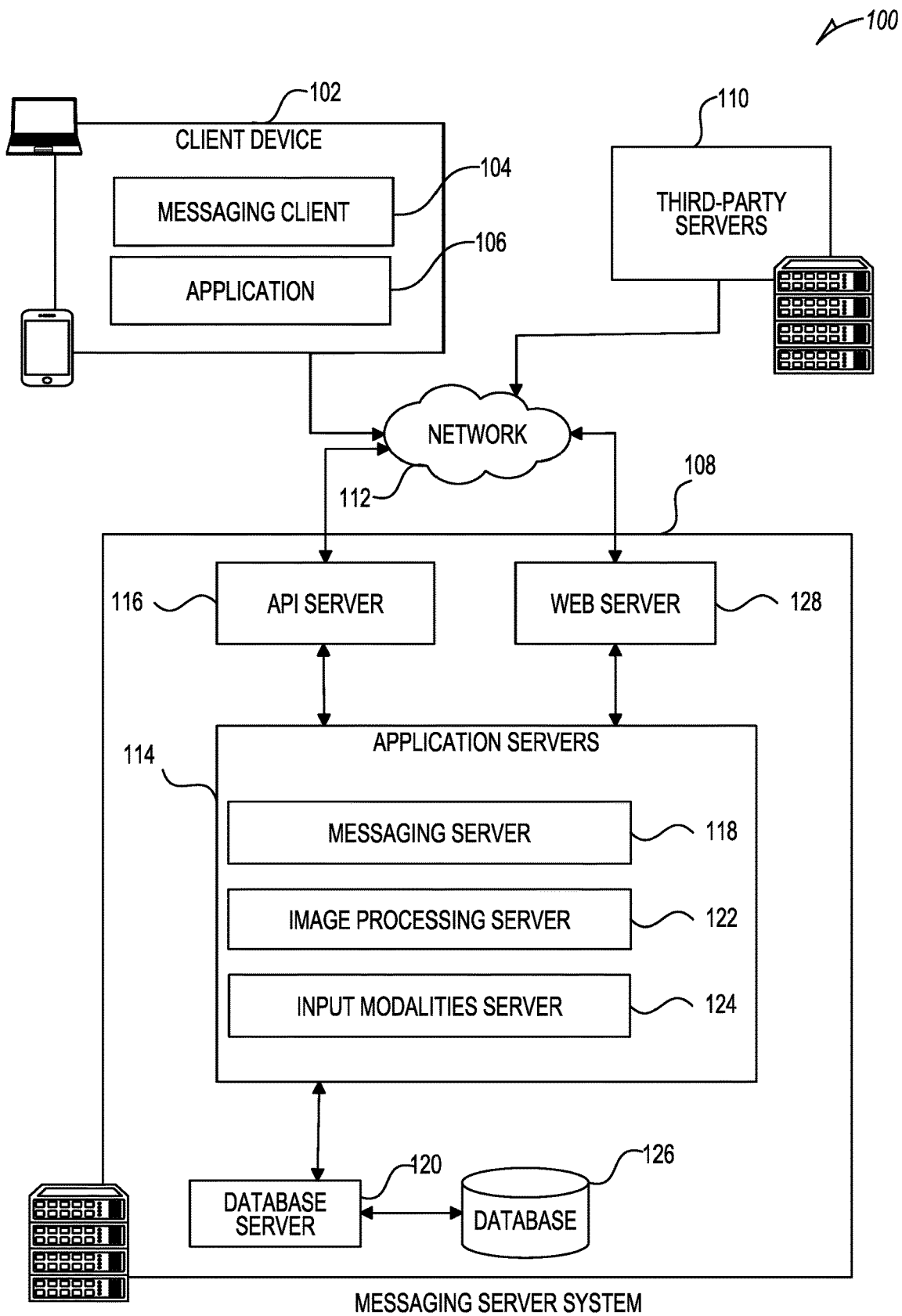
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The AR wearable device 602 is used as an illustrative device; however, one skilled in the art will recognize that the methods, systems, and computer readable medium disclosed herein are applicable to other wearable devices including VR wearable device and MR wearable devices. Application is used to refer to both AR applications, VR applications, MR applications, and applications.

Often AR wearable devices 602 such as AR glasses 1200 have limited physical user interface items such as buttons 1278. Some AR wearable devices 602 have haptic UIs such as one or two buttons 1278, or a touchpad 1276 that the user 616 interacts with on a frame 1232 of the AR wearable device 602. Additionally, applications 648 may have many UI elements 646 such as sliders, buttons, check boxes, and so forth. The number of UI elements 646 the user 616 may want to access on the AR wearable device 602 is numerous. Additionally, legacy applications 648 may not have developed voice UIs. Moreover, often a user 616 may not be able to use haptic UIs because they are engaged in an activity such as bicycle riding or jogging.

One challenge is how to make the UI elements 646 of an application 648 available to the user 616 without the user 616 having to use a haptic 614 interaction with UI elements 646. The UI elements 646 are displayed on a display 606 of the AR wearable device 602. The challenge is addressed by the application 648 having a normal display 656 of the UI elements 646 and a voice UI display 658 for the UI elements 646. In the normal display 656 the UI elements 646 are displayed as they normally are. For example, a slider or button is just a slider or button as one would see in windows operation system. In the voice UI mode 647 additional voice UI labels 662 are displayed to indicate to the user 616 what to say to invoke the UI element 646. Additionally, the voice UI labels 662 are generated by associating a predetermined action 636 with each UI element type 644. The action 636 is often a verb for the user 616 to speak to invoke the UI element 646. The action 636 is coupled with a tag 650 that is used to label the UI element 646 in the normal display 656 mode. The user 616 speaks the action 636 coupled with the tag 650 to invoke the UI element 646. For example, for a button with a tag 650 "Start", the user 616 would speak "Press Start" to invoke the button. The predetermined actions 636 coupled with the tags 650 means that it is easy to process the audio data 618 without a full grammatical analysis, and the user 616 may more easily remember the actions 636. In some embodiments, a neural network is trained to identify the predetermined actions 636 and then the tags 650, which come after the predetermined actions 636, are matched with the audio data 618. In some embodiments, this enables some or all of the audio data 618 processing to be performed on the AR wearable device 602 without transmitting the audio data 618 to be processed on a host computer.

Another challenge is how to enable the use of voice UI display 658 for legacy application 648. The challenge is addressed by a separate UI module 638 that identifies the UI elements 646 the application 648 is displaying and generates the voice UI display 658 for the application 648. The UI module 638 identifies when a user 616 selects a UI element 646 via the voice UI mode 647 and notifies the application 648 that the UI element 646 has been selected so that the application 648 can invoke an event 652 associated with the UI element 646. In this way, a legacy application may be run on AR wearable device 602 without software updates to accommodate a voice UI mode 647.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and an input modalities server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The input modalities server 124 supports input modalities for AR wearable devices. The input modalities server 124 receives requests from an AR wearable device and responds to the requests. The requests include sensor data such as an image being sent to the input modalities server 124 for processing. The input modalities server 124 processes the sensor data and identifies objects within the sensor data and returns names of the objects and positions of the objects within the sensor data to the AR wearable device. Another request from the AR wearable device is for AR applications associated with tags such as "QR code" that may be run on the AR wearable device. The input modalities server 124 may load the AR wearable device with AR applications that are likely to be used by a user of the AR wearable device or respond with AR applications based on criteria given to the input modalities server 124 from the AR wearable device. The criteria may be as a limit on the number of AR applications, preferences of the user such as AR applications with links back to the messaging system 100, and so forth.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
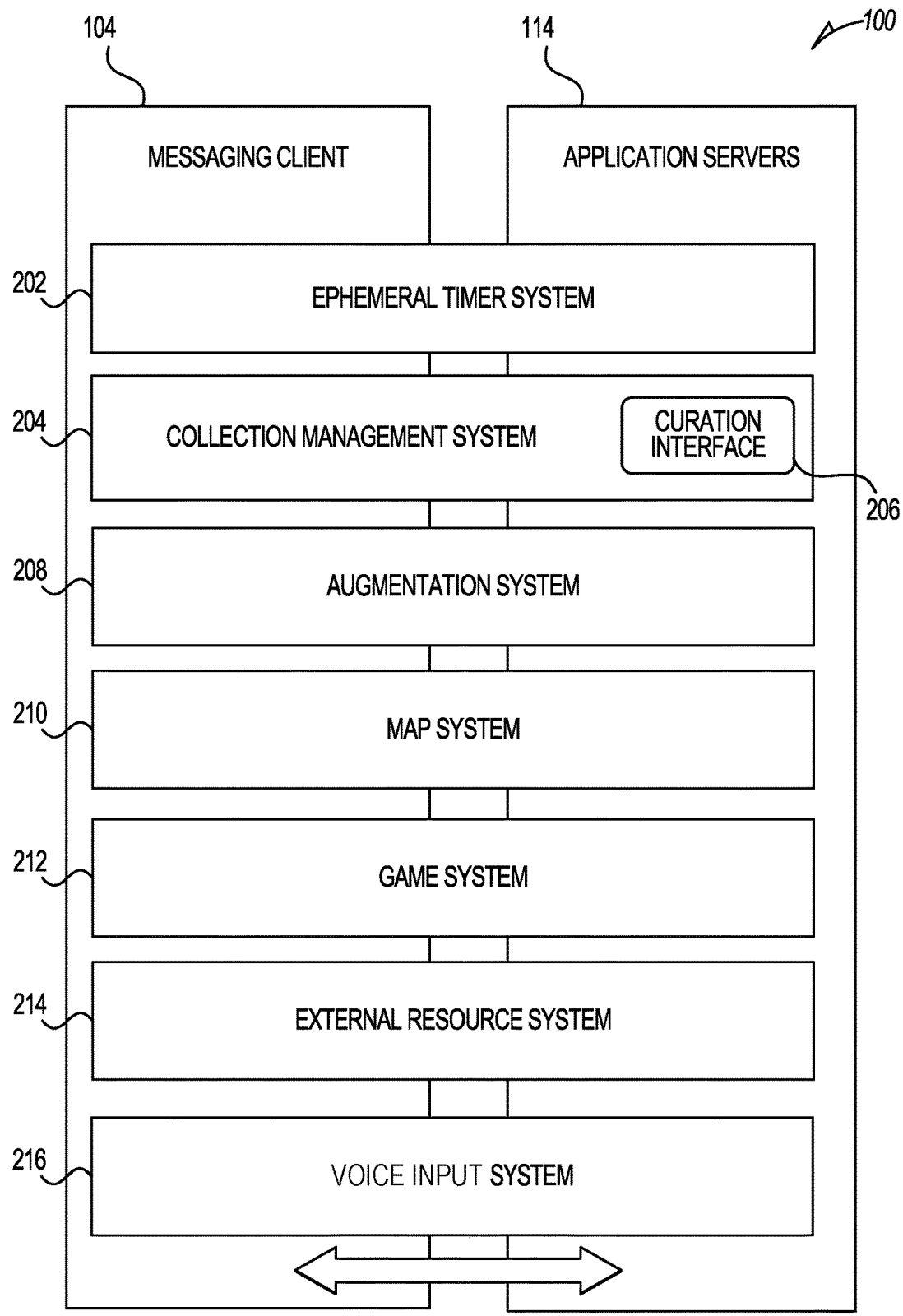
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and a voice input system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object,) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, e.g., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing section of reading materials such as a page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The voice input system 216 supports AR wearable device 602. The voice input system 216 receives requests from an AR wearable device 602 and responds to the requests. The requests include requests to process audio data 618 where a transcription 632 is generated from the audio data 618. The transcription 632 is sent back to the AR wearable device 602. In some embodiments, a request to process the audio data 618 returns an indication of an action of a plurality of predetermined actions 636, or an indication that none of the plurality of predetermined actions 636 are contained in the audio data 618. AR wearable devices 602 may request other services from the voice input system 216 such as requesting weights 626, 630 to be downloaded where the weights 626, 630 are for trained machine learning models such as neural networks.

Data Architecture

Figure 3:
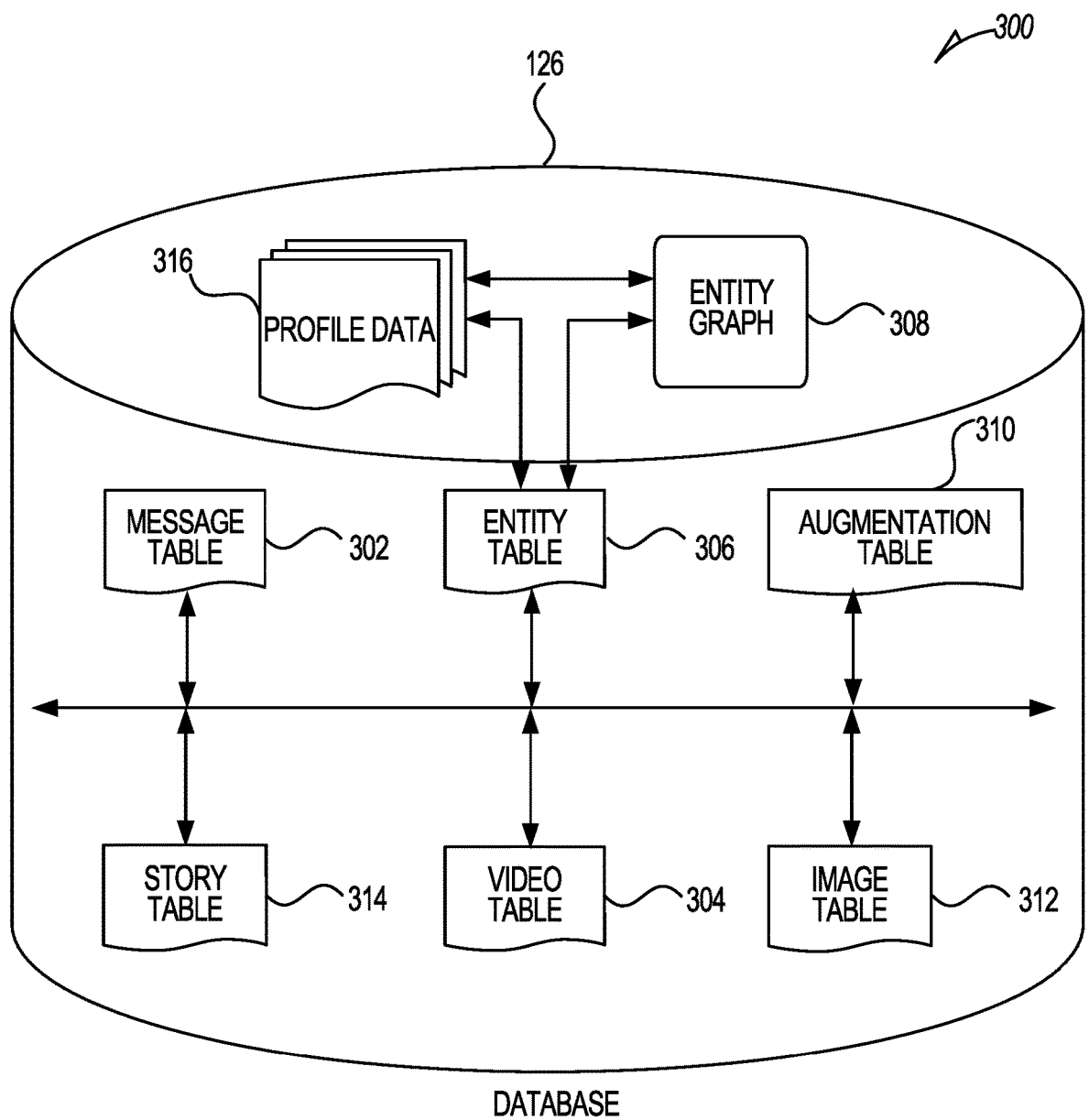
FIG. 3 is a diagrammatic representation of a data structure as maintained in a database, in accordance with some examples.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
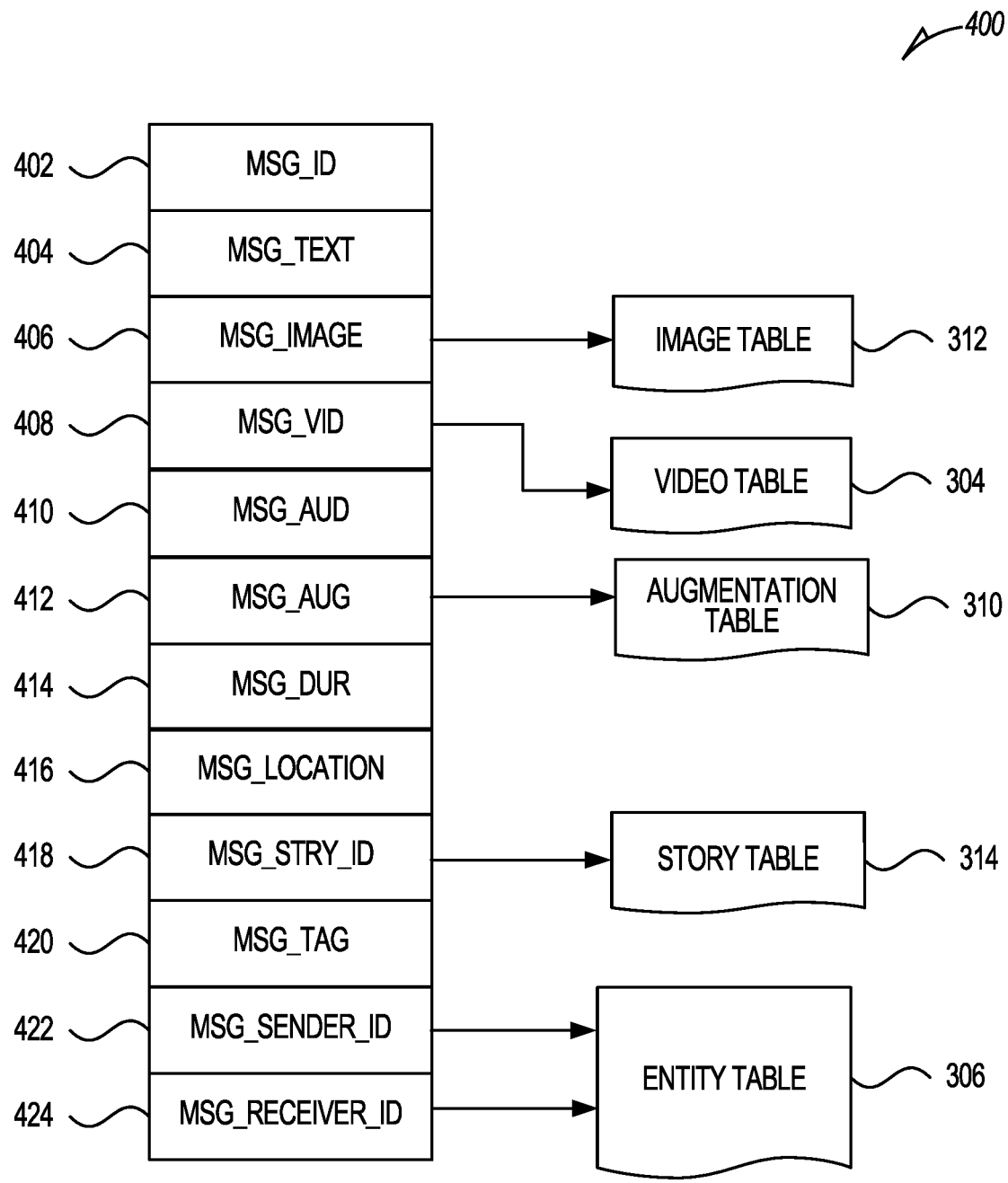
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
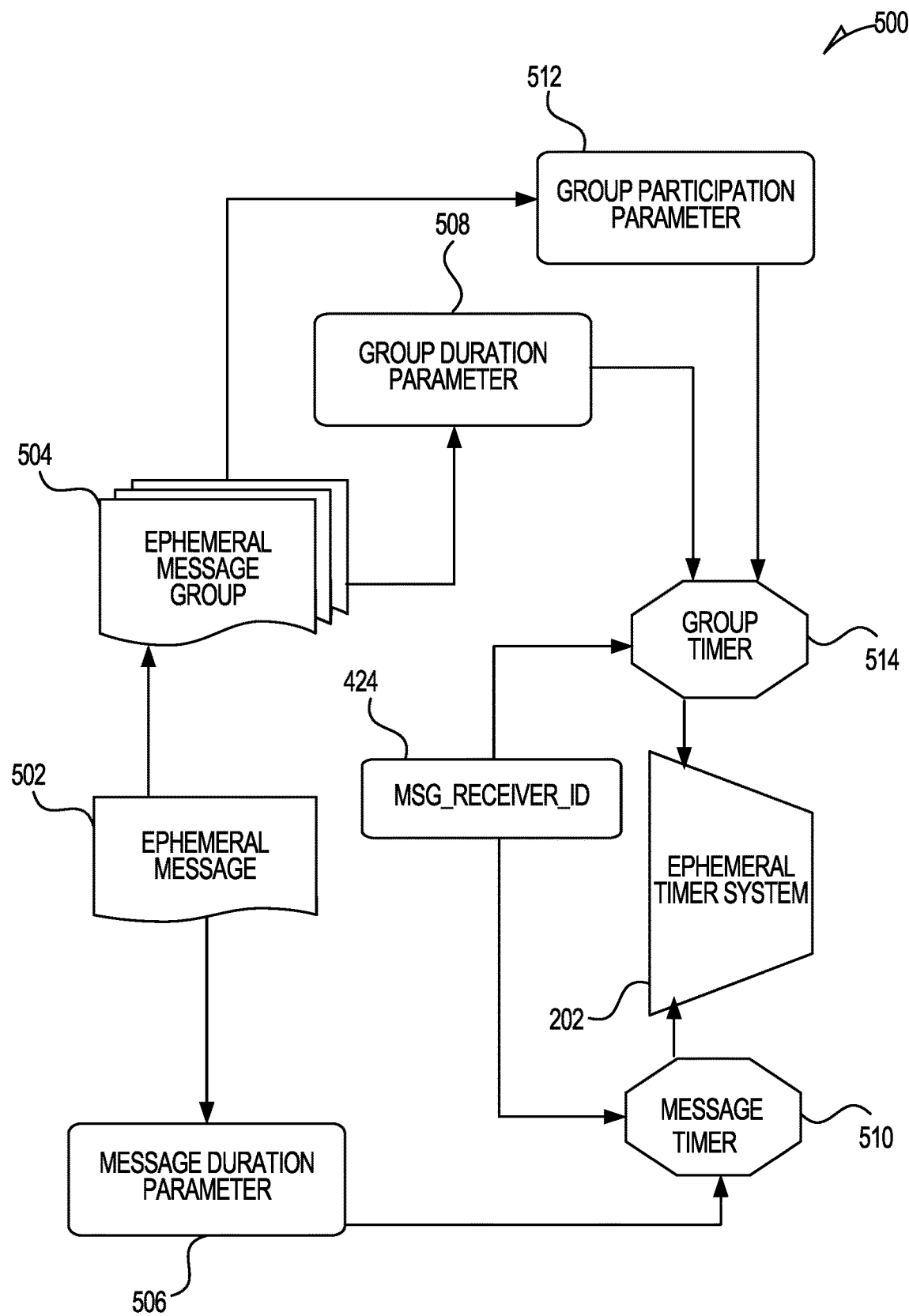
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Voice Controlled UIs for AR Wearable Devices

Figure 6:
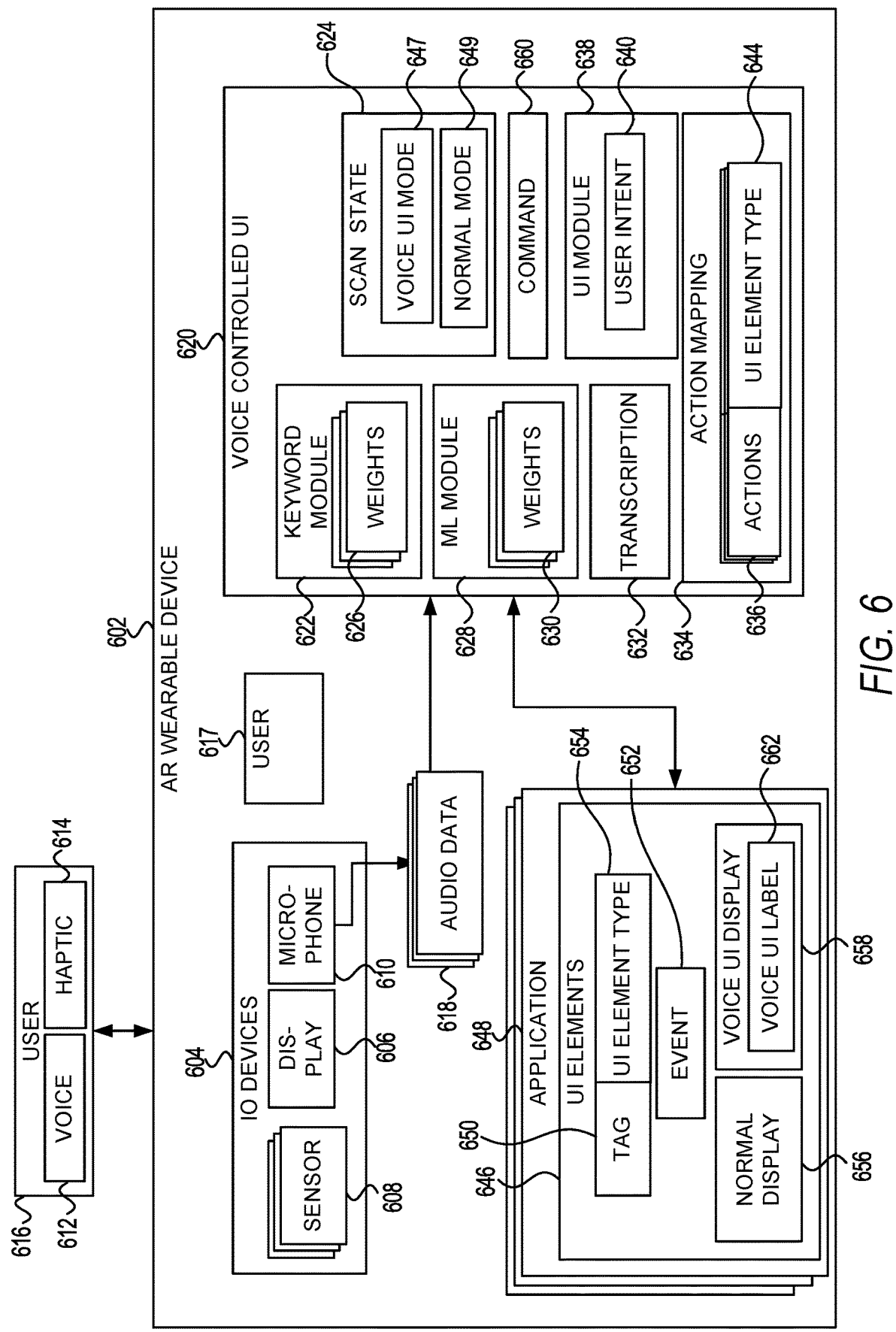
FIG. 6 illustrates an AR wearable device for providing voice-controlled UIs, in accordance with some examples.

FIG. 6 illustrates an AR wearable device 602 for providing voice-controlled UIs, in accordance with some examples. In some embodiments, the AR wearable device 602 is glasses 1200 of FIG. 10. The AR wearable device 602 communicates with the messaging server system 108 or the client device 102, both of which may perform one or more of the operations described herein.

The input/output (IO) devices 604 includes devices that enable a user 616 to interact with the AR wearable device 602. For example, the 10 devices 604 include a display 606, a speaker, a microphone 610, a button 1278, a touchpad 1276, and so forth.

The sensors 608 includes a gyroscope 1280, light sensor, an image sensor or camera 1269, a positioning sensor, a clock, and so forth. Some devices such as a gyroscope 1280 enable a user 616 to interact with the AR wearable device 602 and act as a sensor 608. For example, the user 616 may move the AR wearable device 602 to communicate input to the AR wearable device 602. However, the user 616 may move the AR wearable device 602 without an intent to communicate input to the AR wearable device 602.

The sensors 608 includes wireless communications, in accordance with some examples. Wireless communications include low energy (LE) Bluetooth, Institute for Electrical and Electronic Engineers (IEEE) 802.11 communication standards, proprietary communications standards, and 3GPP communications standards. The wireless communications can be used to determine a location and/or an orientation of the system 600 so the wireless communication may also be considered a sensor 608. The 10 devices 604 include an antenna and transceiver circuitry for performing wireless communications. The wireless communications may be performed by a special purpose chip, which is part of the AR wearable device 602. The microphone 610 generates audio data 618 from the voice 612 of the user 616.

The user 617 is a data structure that represents the user 616 of the AR wearable device 602. The user 617 indicates data stored within the AR wearable device 602 regarding the user 616. The input from the user 616 may be indicated based on a voice 612 of the user 616, a position of the user 616 changing or remaining the same, haptic 614 input from the user 616 such as a button press, and/or a gesture from the user 616 such as a circling of an indication of an UI element 646 by a finger of the user 616, which would be detected by analyzing images captured by the AR wearable device 602 or by movement detectors attached to an appendage of the user 616.

The applications 648 are software, firmware, and/or hardware that reside on the AR wearable device 602 wholly or in part and provide functionality. The applications 648 provide a user interface, see FIG. 7, that is displayed on the display 606. The user interface includes UI elements 646, which include tag 650, UI element type 654, and event 652. The tag 650 is the textual portion of the UI element 646 and may include a graphic, icon, text, and so forth. In some embodiments the tag 650 is not displayed as part of the user interface. The UI element type 654 is the type of UI element such as a button, slider, text field, check boxes, option group, and so forth. The event 652 is the operations that are to be performed upon the selection by the user 616 of the corresponding UI element 646. The normal display 656 is the display of the UI element 646 that is without the voice UI mode 647 being enabled. The voice UI display 658 is the display of the UI element 646 when the voice UI mode 647 is enabled. In some embodiments, the voice UI label 662 comprises the tag 650 with an action 636 that matches the UI element type 654 as described in Table 1.

The scan state 624 indicates whether or not voice UI mode 647 is enabled or not. In the voice UI mode 647 the voice UI display 658 is displayed where actions 636 are associated with the UI element type 644 and displayed on the display 606 in association with the UI element 646 as the voice UI label 662. Additionally, the voice-controlled UI 620 is active and processes the audio data 618 to determine if a UI element 646 has been selected by the user 616. In the normal mode 649 the normal display 656 is displayed where the actions 636 are not displayed in conjunction with the UI elements 646, and the audio data 618 is not processed to determine a selection of a UI element 646.

The keyword module 622 identifies a keyword within the audio data 618 and determines that a command 660 is going to follow the keyword. For example, "Hey spectacles" may be the keyword and then the audio data 618 that follows "Hey spectacles" is the command 660. The keyword module 622 indicates to the machine learning (ML) module 628 that the keyword has been recognized. The ML module 628 and/or the keyword module 622 may be machine learning models such as neural networks or other types of machine learning models. The ML module 628 then generates a transcription 632 of the remaining audio data 618. The functionality of the keyword module 622 and ML module 628 may be split between the two modules differently, there may be more than two modules, or only one module. Additionally, the ML module 628 and/or the keyword module 622 may send the audio data 618 to a remote server for processing. For example, the AR wearable device 602 makes a wireless connection with the host system such as the application server 114 or client device 102. The ML module 628 may transmit a request using the wireless connection to an application server 114 and/or a client device 102. The ML module 628 then receives a response that may be the transcription 632 or an indication of the keyword, a command 660, or an action 636.

In some embodiments, the UI module 638 manages the input from the user 616 and identifies "voice mode" as a command 660 from the transcription 632 and changes the scan state 624 to voice UI mode 647. In voice UI mode 647 the audio data 618 is processed by the ML module 628 where a transcription 632 is generated without the need for the keyword at the beginning. In some embodiments, the keyword must be a prefix before a command 660.

In response to the UI module 638 determining that the scan state 624 is or has just changed to voice UI mode 647, the UI module 638 indicates to the application 648 that the scan state 624 is voice UI mode 647. The application 648 modifies or switches its UI elements 646 from normal display 656 to voice UI display 658. In some embodiments, the UI module 638 modifies the display of the UI elements 646 of the application 648 to supplement the normal display 656 to have the voice UI display 658. The voice UI display 658 indicates what the user 616 should say in order to select the UI element 646.

In some embodiments, there are a subset of the actions 636 associated with a UI element type 644 so that the ML module 628 need only consider the subset of the actions 636. By having a limited number of actions 636 for the ML module 628 to identify, the processing of the audio data 618 may be simplified. For example, the ML module 628 may be trained by, for example, the voice input system 216, to have weights 630 so that the ML module 628 recognizes the actions 636. And then the UI module 638 matches the remaining portion of the audio data 618 with the tags 650 that are displayed on the display 606 to determine which UI element 646 the user 616 selected.

The application 648 after being notified by the voice-controlled UI 620 that the AR wearable device 602 has entered the scan state 624 of voice UI mode 647, sends to the voice-controlled UI 620 for each UI element 646 the tag 650 and the UI element type 654. The UI module 638 sends an action 636, which may be in text format, to match each of the UI element types 654, in accordance with some embodiments.

In some embodiments, for example to support legacy applications 648, the UI module 638 determines the tag 650 and UI element type 654 for UI elements 646 displayed on the display 606 of the AR wearable device 602. The UI module 638 then determines the action 636 for each of the UI elements 646 and updates the normal display 656 to the voice UI display 658. In this way legacy application 648 may be used with voice UI mode 647.

The UI module 638 takes the transcription 632 and determines which action 636 was spoken or uttered by the user 616. The UI module 638 then matches the next or remaining portion of the transcription 632 with the tags 650 of the displayed UI elements 646. If the UI module 638 finds a match with a probability above or that transgresses a threshold that the match is the user intent 640, then the UI module 638 indicates to the application 648 that the UI element 646 was selected. The application 648 will then cause the event 652 to be performed, invoked, or executed.

In some embodiments, if multiple matches are found between the transcription 632 and the actions 636 and/or tags 650, then the UI module 638 will relabel the UI elements 646 that matched with new labels such as "1", "2", "3", and so forth. The user 616 then speaks the new label to select the UI element 646.

Table 1 illustrates an embodiment of action mapping 634. UI element types are mapped to actions. For example, a UI element type 654 of button maps to an action 636 of "press". The predetermined actions 636 for different UI element types 644 simplifies the training of the ML module 628 and/or the keyword module 622. In some embodiments, the ML module 628 is resident in the AR wearable device 602 and trained to identify the action 636 in the audio data 618. The audio data 618 after the action 636 is then compared with the tag 650 to generate a likelihood or probability of a match to the user intent 640. In some embodiments, the audio data 618 after the action 636 is transmitted to the voice input system 216 or client device 102 to generate the transcription 632. In some embodiments, the tag 650 may not be displayed in the normal display 658 but may be used as an indication of the functionality of the UI element type 644. For example, in FIG. 9, the slider 902 may not display "Volume" 908 when the slider 902 is displayed in the normal mode 904, but the functionality "Volume" may be used in displaying "Increase Volume" 912 and "Decrease Volume" 914 in the voice UI mode 906. Moreover, the predetermined actions 636 enables the UI module 638 to generate the voice UI display 658 for legacy applications 648. Additionally, the predetermined actions 636 enable the user 616 to remember the limited set of actions 636 and the actions 636 used for a UI element type 654 is predictable.

TABLE 1

Action Mapping

| Action | UI ELEMENT TYPE |
| --- | --- |
| Press | Button |
| Decrease and increase | Slider |
| Enter | Text Fields |
| Enable and Disable | Check Boxes |
| Pick | Option Group |

Figure 7:
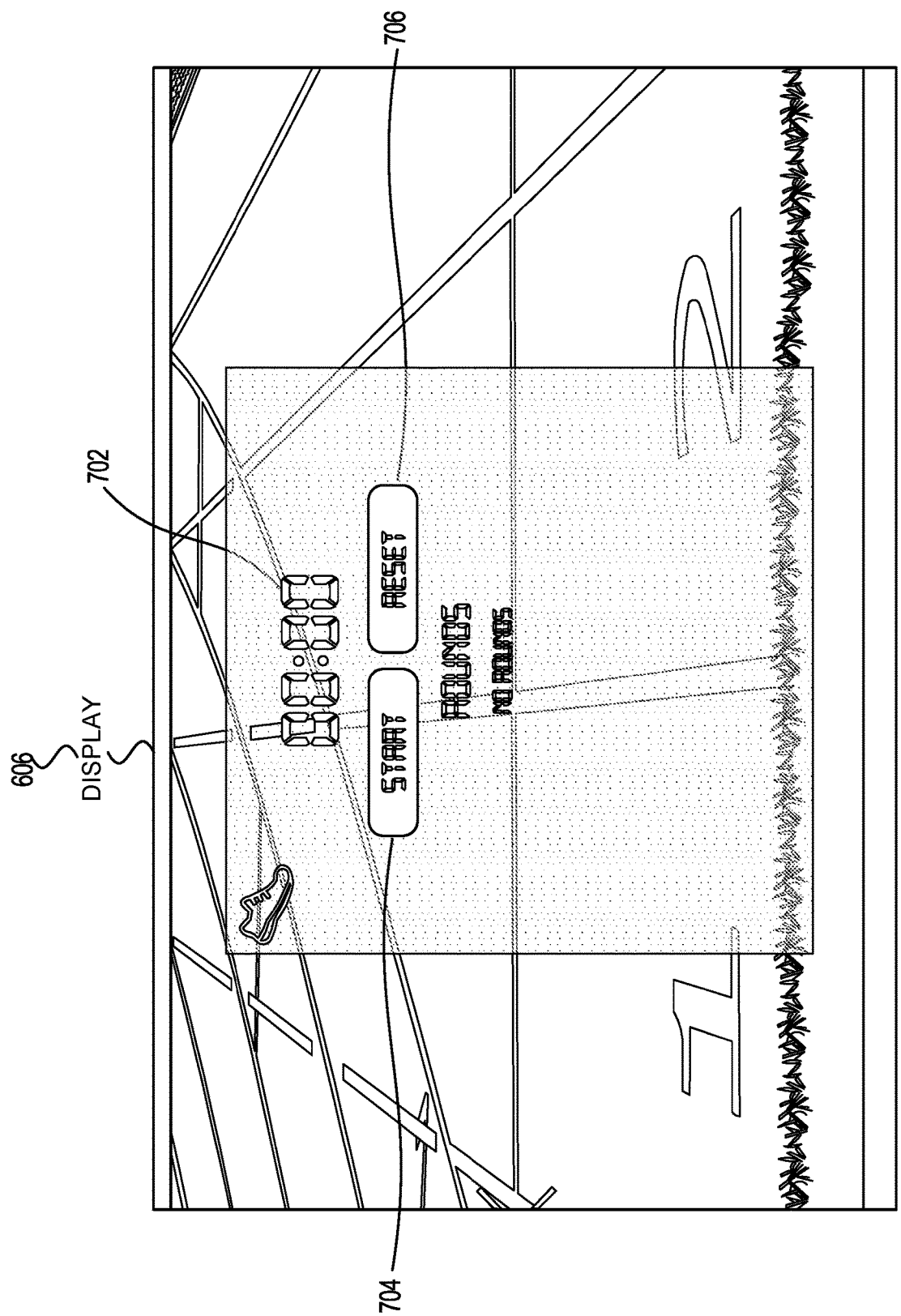
FIG. 7 illustrates an example display where an application displays a normal display on the display of the AR wearable device, in accordance with some embodiments.

FIG. 7 illustrates an example display 606 where an application 648 displays a normal display 656 on the display 606 of the AR wearable device 602, in accordance with some embodiments. An application 648 for a timer displays a time 702, start 704, and reset 706. The UI elements 646 are start 704 and reset 706. The tag 650 for start 704 is "start" and the UI element type 654 is button. The tag 650 for reset 706 is "reset" and the UI element type 654 is button.

Figure 8:
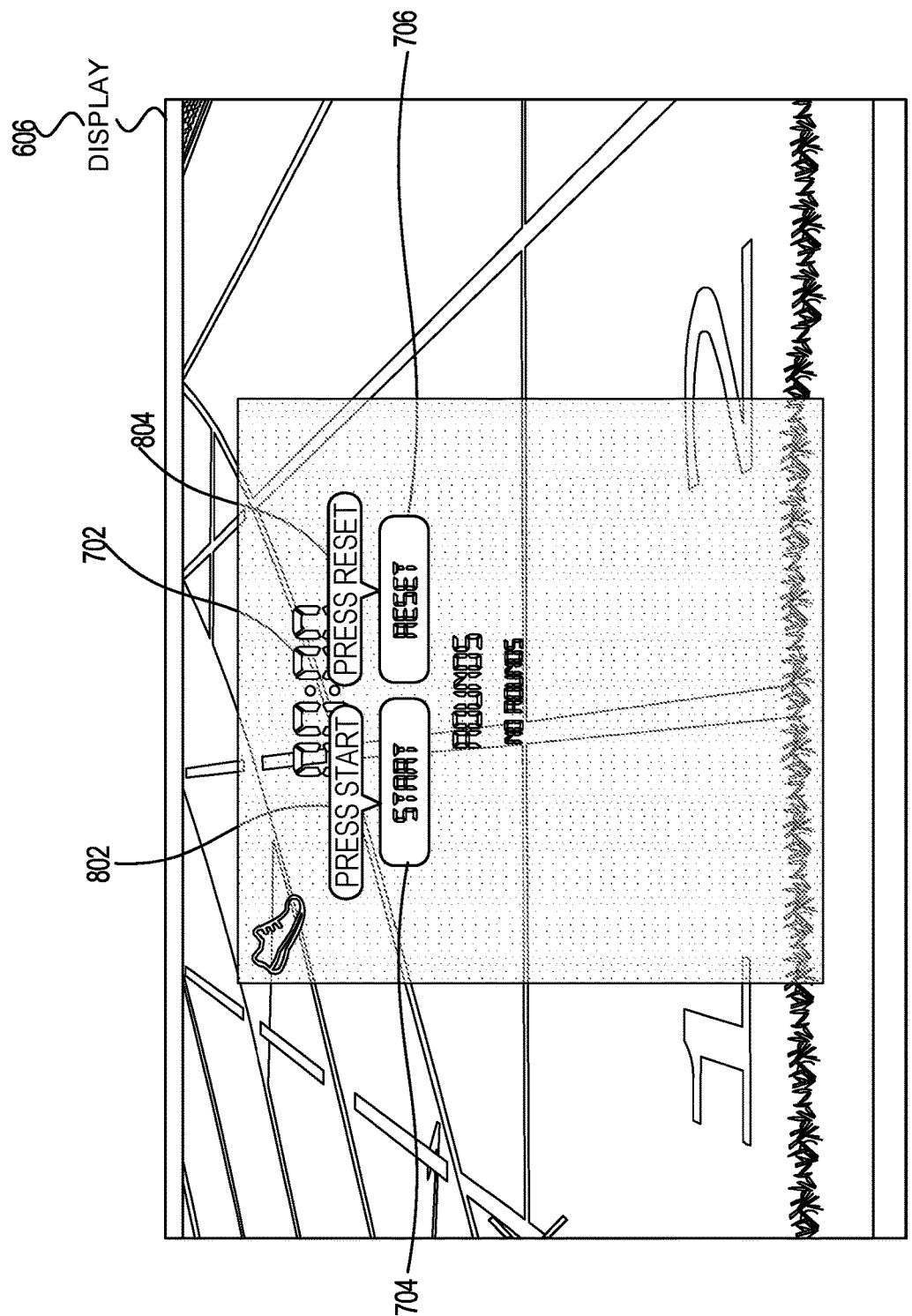
FIG. 8 illustrates an example display where an application displays a voice UI mode on the display of the AR wearable device, in accordance with some embodiments.

FIG. 8 illustrates an example display 606 where an application 648 displays a voice UI display 658 on the display 606 of the AR wearable device 602, in accordance with some embodiments. The voice UI display 658 includes "Press start" 802 and "Press Reset" 804. "Press start" 802 is formed from the action 636 of "Press" being associated with the UI element type 644 of button. The tag 650 for the button is "Start". So, the voice UI display 658 includes "Press Start" 802. "Press Reset" 804 is formed in the same way as "Press Start" 802. The UI module 638 or application 648 displays "Press Start" 802 and "Press Reset" 804. For example, in the case of the application 648 being a legacy application 648, the UI module 638 displays "Press Start" 802 and "Press Reset" 804 because, for legacy applications, as described above the UI module 638 determines the tag 650 and UI element type 654 for UI elements 646 displayed on the display 606 of the AR wearable device 602.

Figure 9:
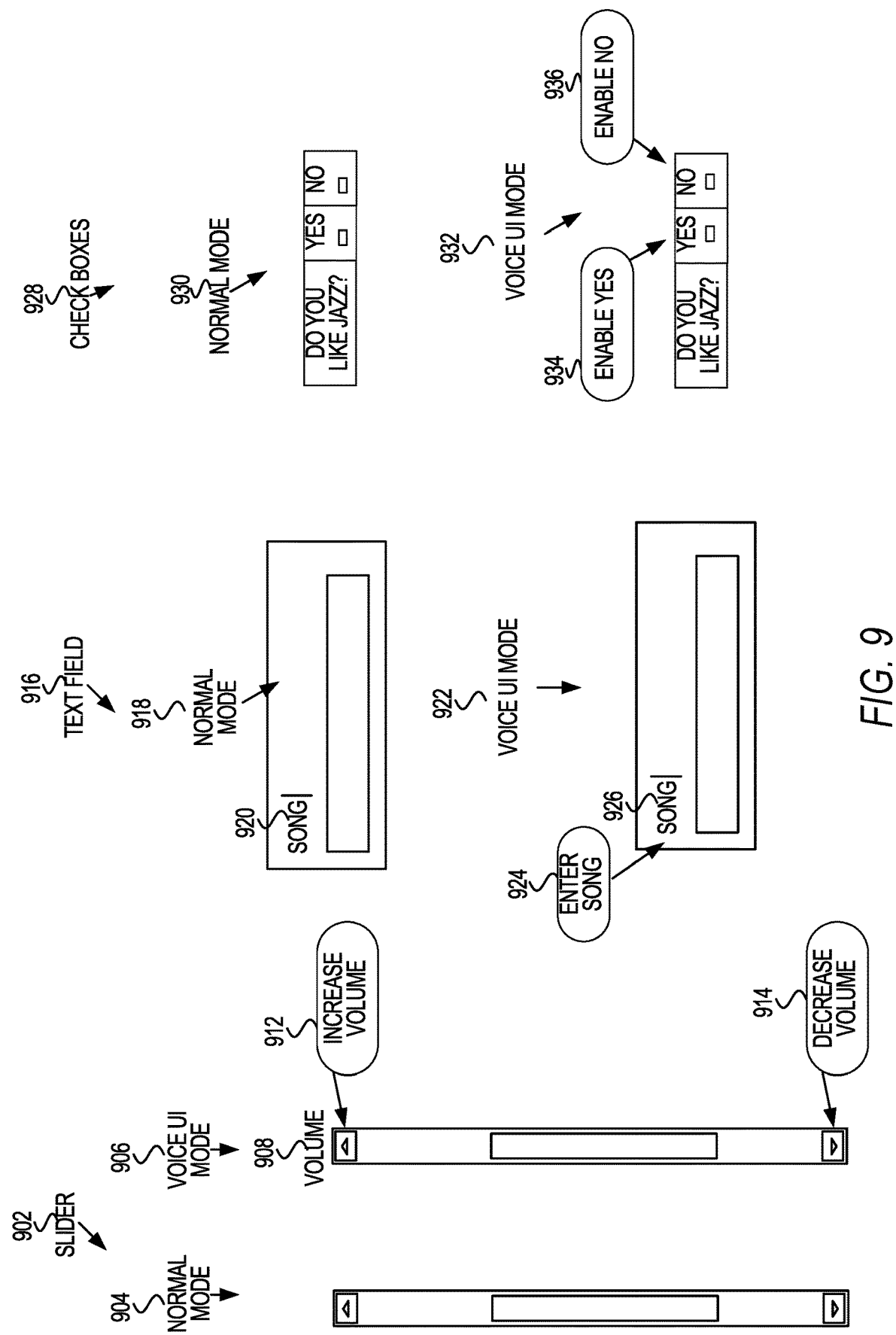
FIG. 9 illustrates example displays of normal mode and voice UI mode for different UI element types, in accordance with some embodiments.

FIG. 9 illustrates example displays of normal display 656 and voice UI display 658 for different UI element types 644, in accordance with some embodiments. A slider 902 in normal mode 904 has a tag 650 of "volume", which is not displayed in the normal mode 904. In voice UI mode 906 the slider 902 has voice UI labels 662 "Increase Volume" 912 and "Decrease Volume" 914 added by the application 648 or the UI module 638. In some embodiments, the "Volume" 908 is also added in the voice UI mode 906.

The text field 916 is another UI element type 644. The normal mode 918 illustrates a text field with a tag 650 of "Song" 920. The voice UI mode 922 includes "Enter Song", which is displayed by the application 648 or the UI module 638. The action 636 is based on Table 1 with the UI element type 644 indicating an action 636 of "Enter".

The check box 928 is another UI element type 644. The normal mode 930 illustrates a check box with tags 650 of "YES" and "NO". The voice UI mode 932 includes "Enable Yes" and "Enable No", which is displayed by the application 648 or the UI module 638. The action 636 is based on Table 1 with the UI element type 644 check boxes 928 indicating an action 636 of "Enable".

Figure 10:
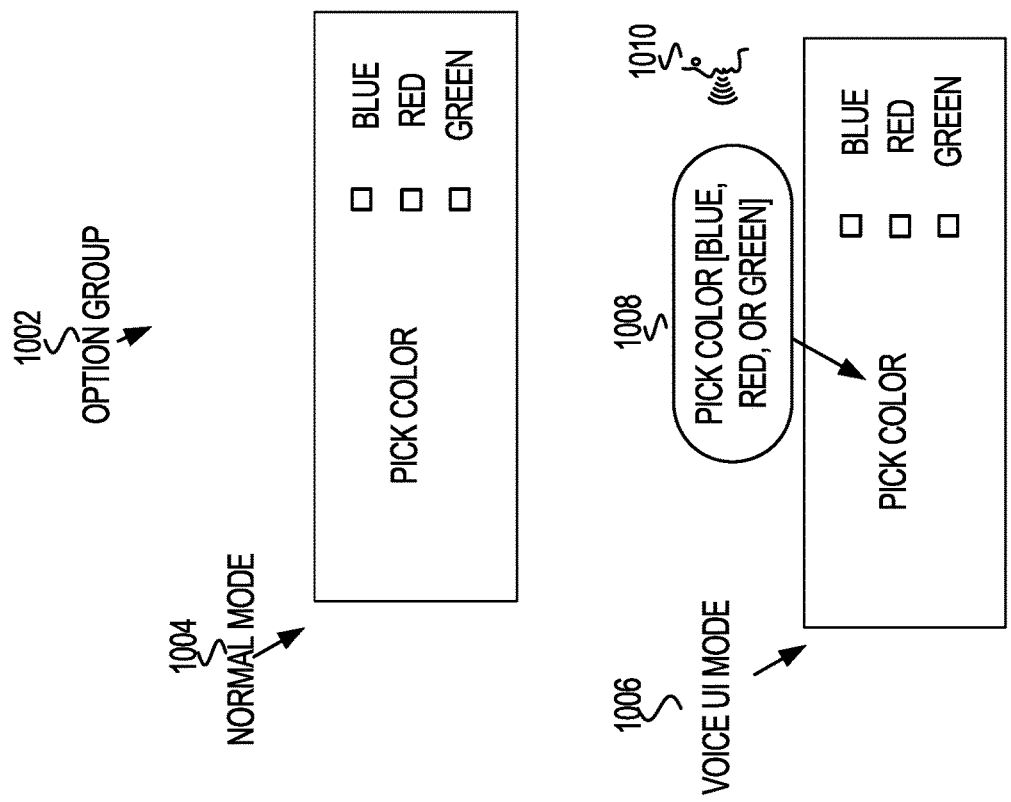
FIG. 10 illustrates an example display of normal mode and voice UI mode for an option group UI element type, in accordance with some embodiments.

FIG. 10 illustrates an example normal display 656 and voice UI display 658 for an option group 1002 UI element type 644, in accordance with some embodiments. The option group 1002 is another UI element type 644. The normal mode 1004 illustrates an option group tag 650 of "Pick Color". The voice UI mode 1006 includes "Pick Color [Blue, Red, or Green]", which is displayed by the application 648 or the UI module 638. The action 636 is based on Table 1 with the UI element type 644 of option group indicating an action 636 of "Pick". In this example, the labels or tags 650 of the option boxes or selection buttons are incorporated into the voice UI mode 1006. The voice UI labels 662 of the voice UI display 658, for example as displayed in FIGS. 7-9, may include a special outline, font, bubble, icon 1010, or another indication that the user 616 is to utter or vocalize the words in the voice UI display 658.

Figure 11:
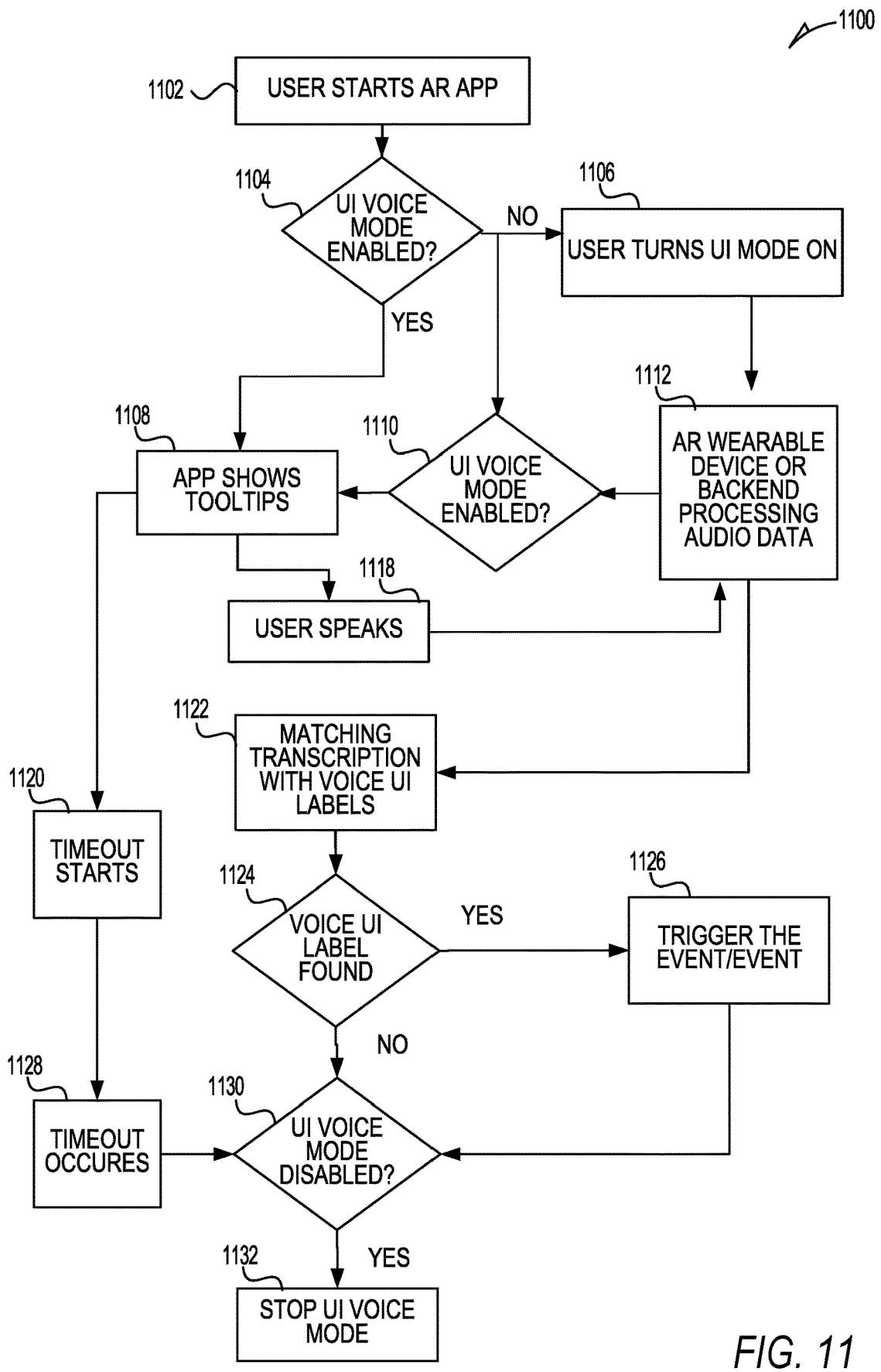
FIG. 11 illustrates a method of voice-controlled UIs for AR wearable devices, in accordance with some embodiments.

FIG. 11 illustrates a method 1100 of voice-controlled UIs for AR wearable devices, in accordance with some embodiments. The method 1100 begins at operation 1102 with the user starting an AR application. For example, user 616 may start application 648. The method 1100 continues at operation 1104 with determining whether UI voice mode is enabled. For example, the UI module 638 determines whether or not the scan state 624 is in voice UI mode 647 or normal mode 649. If the voice UI mode 647 is normal mode 649, then the method 1100 continues at operation 1106 with the user turning on voice UI mode. For example, the user 616 generates audio data 618 that includes a command 660 such as "Hey spectacles, voice mode". The audio data 618 is processed at operation 1112 with an AR wearable device or backend processing the audio data. For example, the keyword module 622, ML module 628, and/or a backend host/server processes the audio data 618.

The method 1100 continues at operation 1110 with determining whether the UI voice mode is enabled. If the audio data 618 does not include a command 660 to enable voice mode, then the method 1100 returns to operation 1106. If the audio data 618 indicates that the voice mode is to be enabled, then the voice-controlled UI 620 changes the scan state 624 to a value of voice UI mode 647. The method 1100 continues to operation 1108 with the application showing tooltips. For example, the tooltips are voice UI display 658 of FIG. 8 where "Press Start" 802 and "Press Reset" 804 are displayed on the display 606 of the AR wearable device 602. The term tooltips may be used instead of voice UI label 662 or voice UI display 658, in accordance with some embodiments.

If the user does not speak, then the method 1100 will continue at operation 1120 with starting a timeout. For example, there may be a timeout period such as 10 seconds or another time. The method 1100 continues at operation 1128 with the timeout occurring. For example, if the user 616 does not speak for a period of time greater than a timeout period, then the timeout occurs, which brings the method 1100 back to operation 1130.

If the user 616 does speak, then the method 1100 continues at operation 1118 with the user speaking. For example, the user 616 generates audio data 618. The method 1100 continues at operation 1112 with AR wearable device or backend processing audio data. For example, the keyword module 622, ML module 628, and/or a backend host/server processes the audio data 618.

The method 1100 continues at operation 1122 with matching the transcription with voice UI labels. For example, the transcription 632 is compared with voice UI labels 662 to determine if there is a match.

The method 1100 continues at operation 1124 with determining whether a voice UI label was found. For example, if the user 616 spoke "Press Start" and the transcription 632 is "Press Start", then this would be matched to voice UI label 662 of "Press Start" 804 of FIG. 8.

If the voice UI label is found, then the method 1100 continues at operation 1126 with triggering the event associated with the voice UI label. Continuing the example above, the voice UI label 662 of "Press Start" 804 would correspond to event 652, which would be invoked by the application 648. The method 1100 continues to operation 1130.

If the voice UI label is not found, then the method 1100 continues to operation 1130 with determining whether the UI voice mode is disabled. For example, the UI module 638 determines whether the scan state 624 is voice UI mode 647. If the UI voice mode is disabled, then the method 1100 continues to operation 1132 with stopping UI voice mode. For example, the UI module 638 may set the scan state 624 to normal mode 649 and notify the application 648 that the scan state 624 is no longer voice UI mode 647. The display 606 is updated to the normal display 656. If the voice mode is not disabled, then the method 1100 returns to operation 1108 or operation 1118 depending on the state of the display 606.

If in operation 1124 there are multiple matches between the transcription and the voice UI labels or the matching to the user intent 640 is not to a certainty that is greater than or transgresses a threshold, then the method 1100 may perform disambiguation steps. For example, the method 1100 displays on the display 606 a label next to or replaces each of the voice UI labels 662 with a number such as "1", "2", "3", and so on. The user 616 then selects the number of the voice UI label 662 to complete the user intent 640. Other methods may be used to disambiguate between multiple matches. For example, the possible voice UI labels 662 that matched might blink and text may be displayed for the user 616 to repeat their selection.

The method 1100 may include one or more additional operations. Operations of method 1100 may be performed in a different order. One or more of the operations of method 1100 may be optional. The method 1100 may be performed by the client device 102, system 600, glasses 1200, or another electronic device. Portions of the functionality may be performed on a server computer or host computer. For example, glasses 900 may be coupled to a host client device 102 or application server 114 where one or more of the operations are performed.

Figure 12:
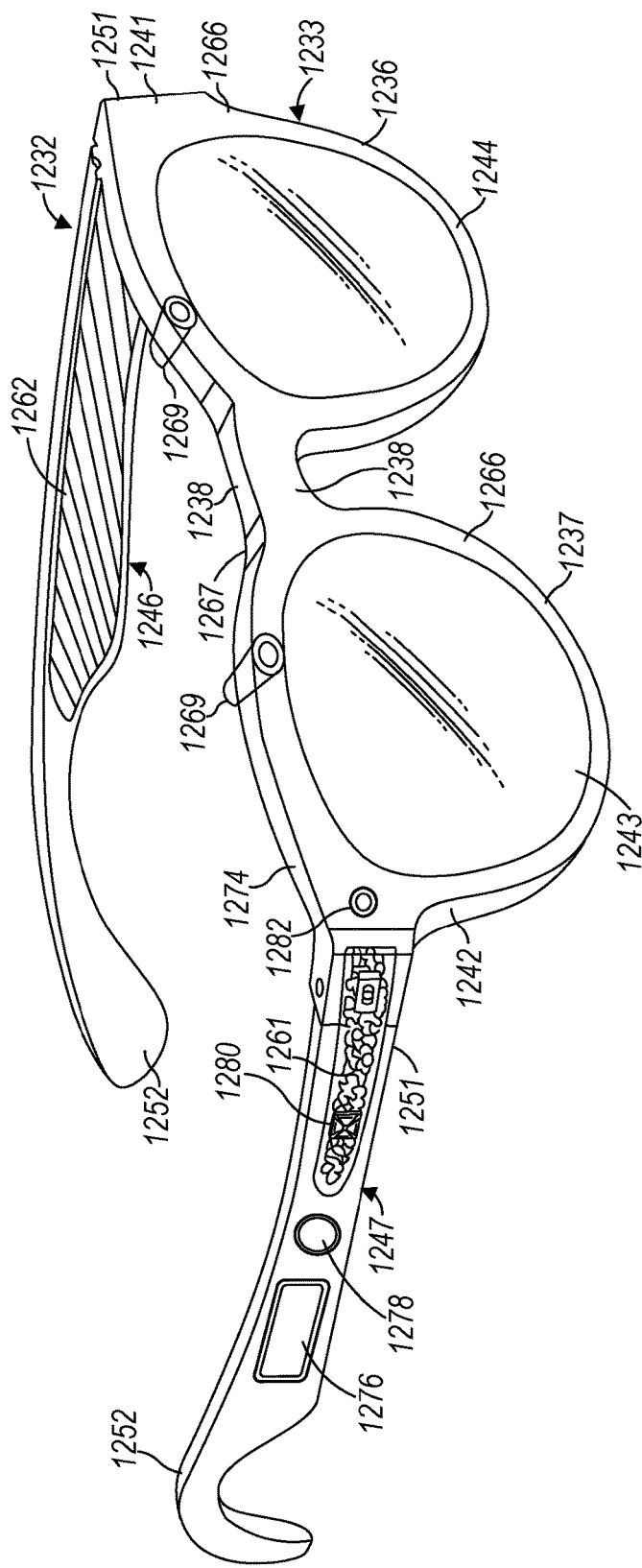
FIG. 12 is a perspective view of a wearable electronic device in the form of glasses 1200, in accordance with some examples.

FIG. 12 is a perspective view of a wearable electronic device in the form of glasses 1200, in accordance with some examples. The glasses 1200 are an article of eyewear including electronics, which operate within a network system for communicating image and video content. In some examples, the wearable electronic device is termed AR glasses. The glasses 1200 can include a frame 1232 made from any suitable material such as plastic or metal, including any suitable shape memory alloy. The frame 1232 can have a front piece 1233 that can include a first or left lens, display, or optical element holder 1236 and a second or right lens, display, or optical element holder 1237 connected by a bridge 1238. The front piece 1233 additionally includes a left end portion 1241 and a right end portion 1242. A first or left optical element 1244 and a second or right optical element 1243 can be provided within respective left and right optical element holders 1236, 1237. Each of the optical elements 1243, 1244 can be a lens, a display, a display assembly, or a combination of the foregoing. In some examples, for example, the glasses 1200 are provided with an integrated near-eye display mechanism that enables, for example, display to the user of preview images for visual media captured by cameras 1269 of the glasses 1200.

The frame 1232 additionally includes a left arm or temple piece 1246 and a right arm or temple piece 1247 coupled to the respective left and right end portions 1241, 1242 of the front piece 1233 by any suitable means such as a hinge (not shown), so as to be coupled to the front piece 1233, or rigidly or fixedly secured to the front piece 1233 so as to be integral with the front piece 1233. Each of the temple pieces 1246 and 1247 can include a first portion 1251 that is coupled to the respective end portion 1241 or 1242 of the front piece 1233 and any suitable second portion 1252, such as a curved or arcuate piece, for coupling to the ear of the user. In one example, the front piece 1233 can be formed from a single piece of material, so as to have a unitary or integral construction. In one example, the entire frame 1232 can be formed from a single piece of material so as to have a unitary or integral construction.

The glasses 1200 include a computing device, such as a computer 1261, which can be of any suitable type so as to be carried by the frame 1232 and, in some examples, of a suitable size and shape, so as to be at least partially disposed in one or more of the temple pieces 1246 and 1247. In one example, the computer 1261 has a size and shape similar to the size and shape of one of the temple pieces 1246, 1247 and is thus disposed almost entirely if not entirely within the structure and confines of such temple pieces 1246 and 1247.

In one example, the computer 1261 can be disposed in both of the temple pieces 1246, 1247. The computer 1261 can include one or more processors with memory, wireless communication circuitry, and a power source. The computer 1261 comprises low-power circuitry, high-speed circuitry, location circuitry, and a display processor. Various other examples may include these elements in different configurations or integrated together in different ways. Additional details of aspects of the computer 1261 may be implemented as described with reference to the description that follows.

The computer 1261 additionally includes a battery 1262 or other suitable portable power supply. In one example, the battery 1262 is disposed in one of the temple pieces 1246 or 1247. In the glasses 1200 shown in FIG. 12, the battery 1262 is shown as being disposed in the left temple piece 1246 and electrically coupled using a connection 1274 to the remainder of the computer 1261 disposed in the right temple piece 1247. One or more input and output devices can include a connector or port (not shown) suitable for charging a battery 1262 accessible from the outside of the frame 1232, a wireless receiver, transmitter, or transceiver (not shown), or a combination of such devices.

The glasses 1200 include digital cameras 1269. Although two cameras 1269 are depicted, other examples contemplate the use of a single or additional (i.e., more than two) cameras 1269. For ease of description, various features relating to the cameras 1269 will be described further with reference to only a single camera 1269, but it will be appreciated that these features can apply, in suitable examples, to both cameras 1269.

In various examples, the glasses 1200 may include any number of input sensors or peripheral devices in addition to the cameras 1269. The front piece 1233 is provided with an outward-facing, forward-facing, front, or outer surface 1266 that faces forward or away from the user when the glasses 1200 are mounted on the face of the user, and an opposite inward-facing, rearward-facing, rear, or inner surface 1267 that faces the face of the user when the glasses 1200 are mounted on the face of the user. Such sensors can include inward-facing video sensors or digital imaging modules such as cameras 1269 that can be mounted on or provided within the inner surface 1267 of the front piece 1233 or elsewhere on the frame 1232 so as to be facing the user, and outward-facing video sensors or digital imaging modules such as the cameras 1269 that can be mounted on or provided with the outer surface 1266 of the front piece 1233 or elsewhere on the frame 1232 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 1243, 1244 (or lenses) to provide a mixed reality or augmented reality experience for the user of the glasses 1200.

The glasses 1200 further include an example of a camera control mechanism or user input mechanism comprising a camera control button mounted on the frame 1232 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1232 adjacent to its surface for detecting the presence of a user's finger, to dispose the touch-sensitive button to the engaged condition when the user touches a finger to the corresponding spot on the outer surface 1266 of the frame 1232. It will be appreciated that the above-described camera control button and capacitive touch button are but two examples of a haptic input mechanism for single-action control of the camera 1269, and that other examples may employ different single-action haptic control arrangements.

The computer 1261 is configured to perform the methods described herein. In some examples, the computer 1261 is coupled to one or more antennas for reception of signals from a GNSS and circuitry for processing the signals where the antennas and circuitry are housed in the glasses 1200. In some examples, the computer 1261 is coupled to one or more wireless antennas and circuitry for transmitting and receiving wireless signals where the antennas and circuitry are housed in the glasses 1200. In some examples, there are multiple sets of antennas and circuitry housed in the glasses 1200. In some examples, the antennas and circuitry are configured to operate in accordance with a communication protocol such as Bluetooth™, Low-energy Bluetooth™, IEEE 802, IEEE 802.11az/be, LTE, proprietary communications standard, 3GPP, and so forth. In some examples, PDR sensors are housed in glasses 1200 and coupled to the computer 1261. In some examples, the glasses 1200 are VR headsets where optical elements 1243, 1244 are opaque screens for displaying images to a user of the VR headset. In some examples, the computer 1261 is coupled to user interface elements such as slide or touchpad 1276 and button 1278. A long press of button 1278 resets the glasses 1200. The slide or touchpad 1276 and button 1278 are used for a user to provide input to the computer 1261 and/or other electronic components of the glasses 1200. The glasses 1200 include one or more microphones 1282 that are coupled to the computer 1261. The glasses 1200 include one or more gyroscopes 1280.

Figure 13:
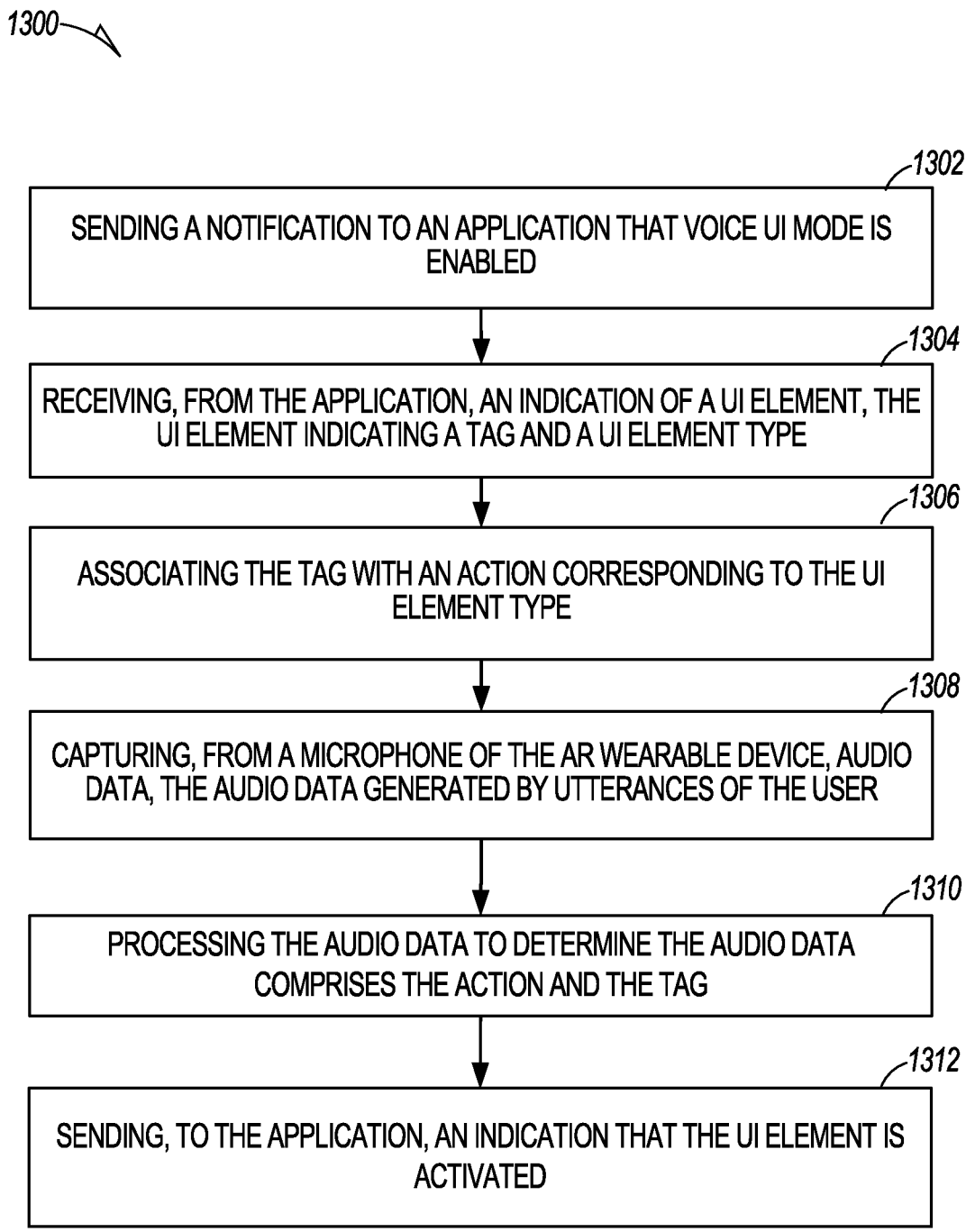
FIG. 13 illustrates a method for voice input for AR wearable devices, in accordance with some embodiments.

FIG. 13 illustrates a method 1300 for voice input for AR wearable devices, in accordance with some embodiments. The method 1300 is performed on an augmented reality (AR) wearable device. The method 1300 begins at operation 1302 with sending a notification to an application that voice UI mode is enabled. For example, the voice-controlled UI 620 sends an indication such as a procedure call to the application 648 that the scan state 624 is voice UI mode 647. The method 1300 continues at operation 1304 with receiving, from the application, an indication of a UI element, the UI element indicating a tag and a UI element type. For example, the application 648 sends to the UI module 638 indications of one or more UI elements 646 that are currently being displayed on the display 606 of the AR wearable device 602.

The method 1300 continues at operation 1306 with associating the tag with an action corresponding to the UI element type. For example, the UI module 638 determines an action 636 based on the UI element type 654 sent to the UI module 638 from the application 648.

The method 1300 continues at operation 1308 with capturing, from a microphone of the AR wearable device, audio data, the audio data generated by utterances of the user. For example, the microphone 610 generates audio data 618 from the voice 612 or utterances of the user 616. The method 1300 continues at operation 1310 with processing the audio data to determine the audio data comprises the action and the tag. For example, the keyword module 622, ML module 628, or a remote host computer processes the audio data 618 to generate the transcription 632. The UI module 638 then matches the transcription 632 with the action 636 and the tag 650 to determine that the UI element 646 has been selected.

The method 1300 continues at operation 1312 with sending, to the application, an indication that the UI element is activated. For example, the UI module 638 sends to the application 648 an indication that the UI element 646 has been selected. The application 648 performs the event 652 in response to the notification that the UI element 646 has been selected.

The method 1300 may include one or more additional operations. Operations of method 1300 may be performed in a different order. One or more of the operations of method 1300 may be optional. The method 1300 may be performed by the client device 102, system 600, glasses 1200, or another electronic device. Portions of the functionality may be performed on a server computer or host computer. For example, glasses 900 may be coupled to a host client device 102 or application server 114 where one or more of the operations are performed such as processing the audio data 618.

Machine Architecture

Figure 14:
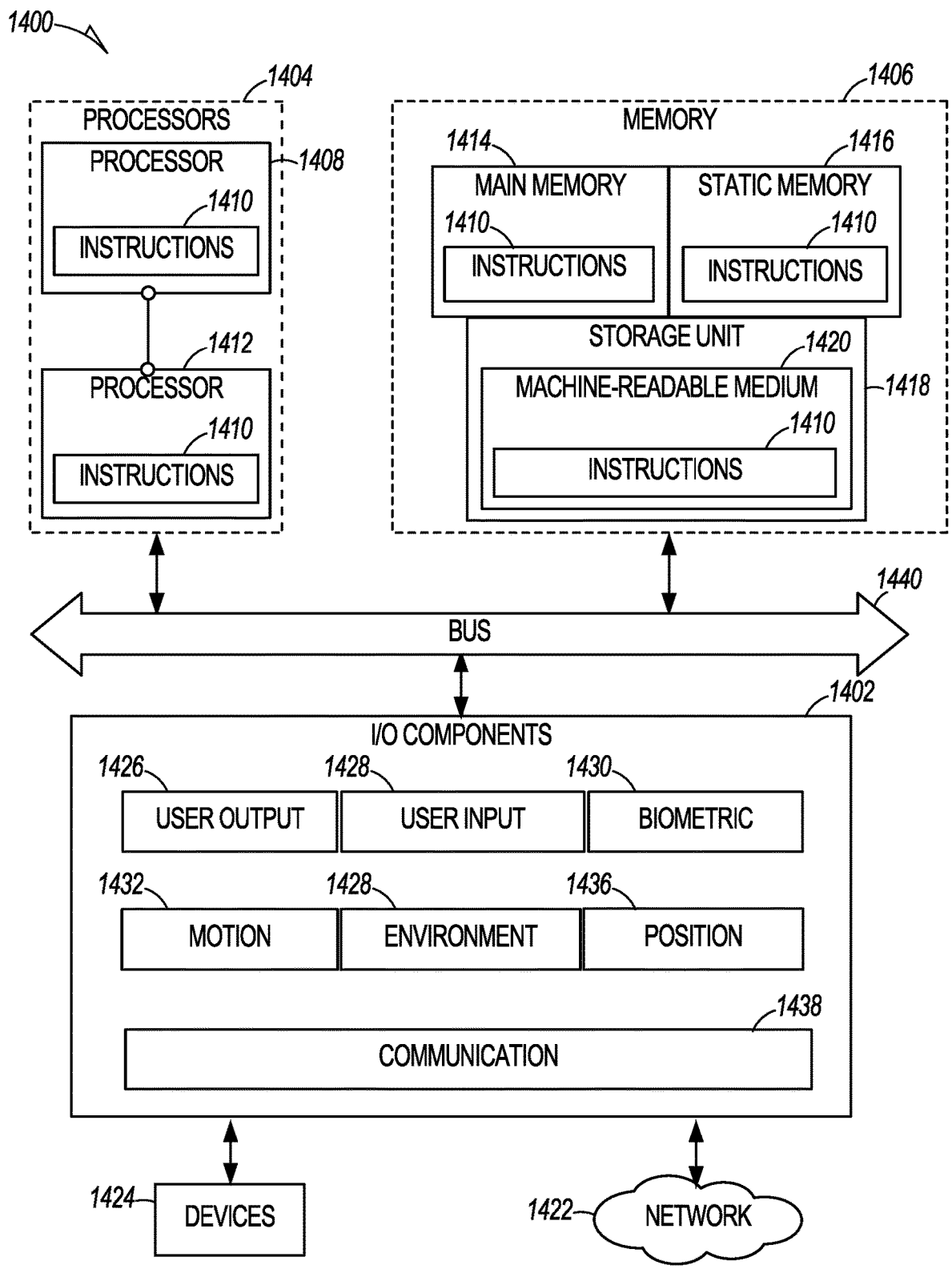
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
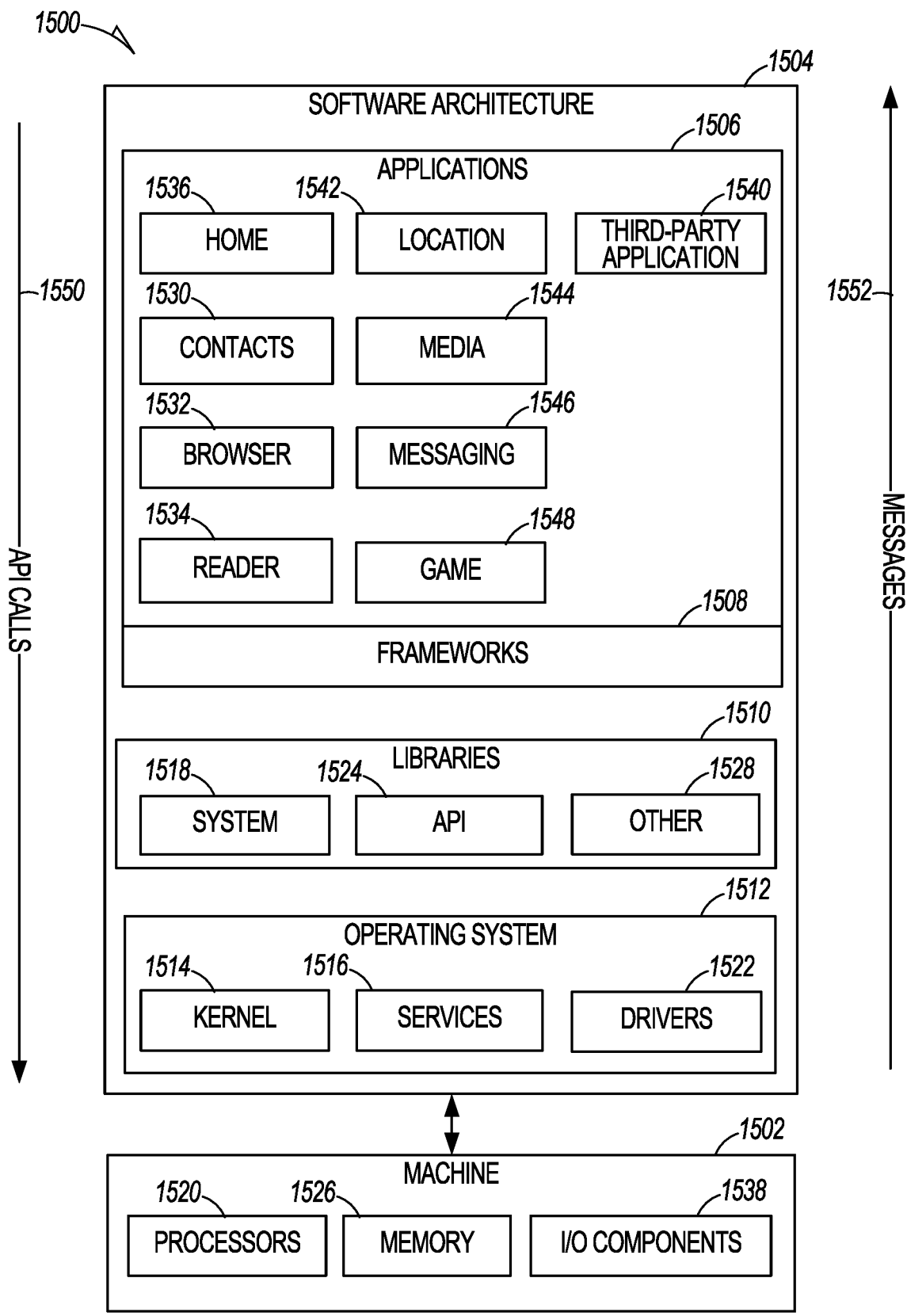
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
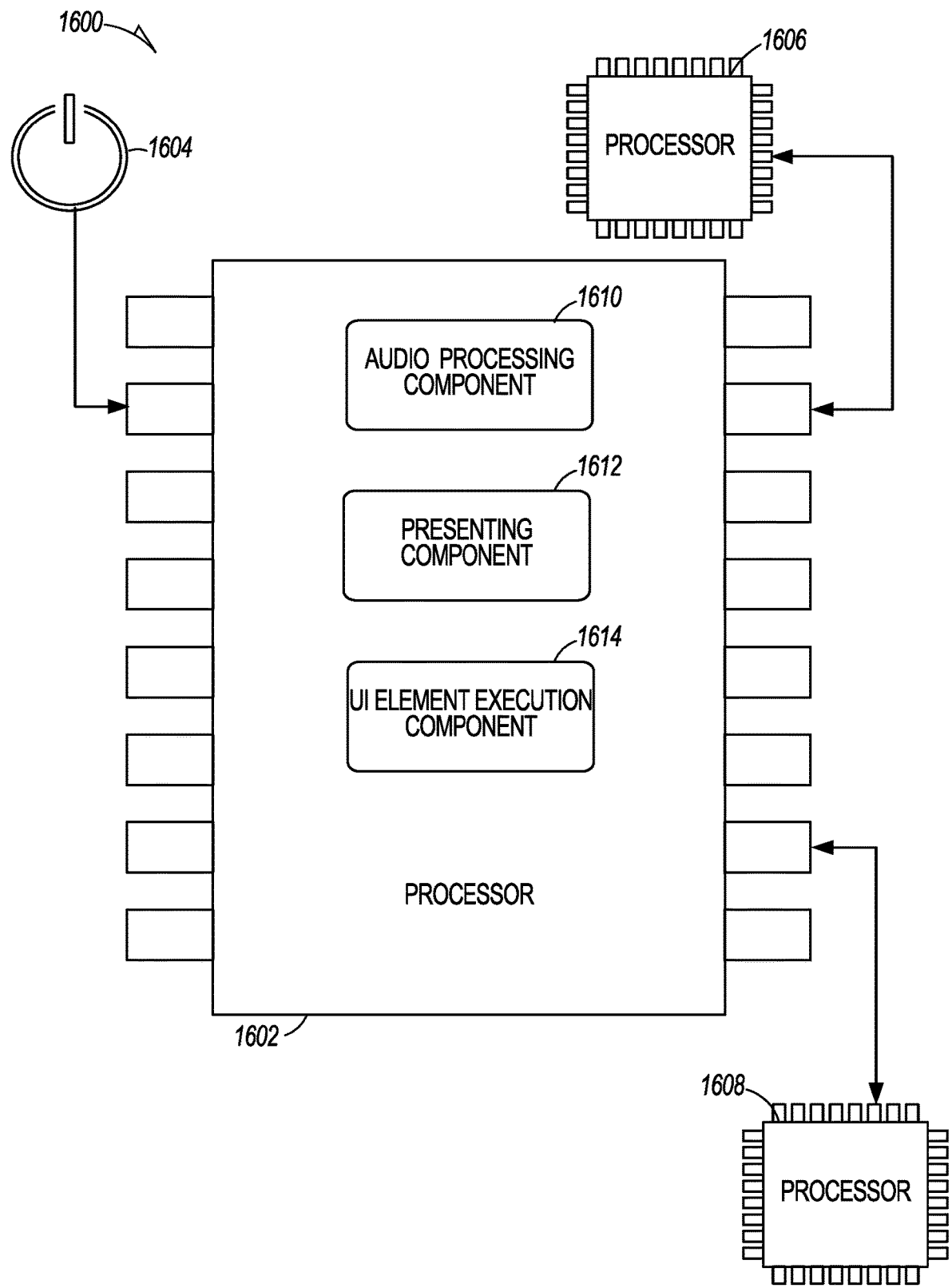
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely an audio processing component 1610, a presenting component 1612, and a UI element execution component 1614. The audio processing component 1610 is invoked to process audio data 618. For example, examples of the audio processing component 1610 include the keyword module 622 and the ML module 628. The presenting component 1612 presents the voice UI display 658 on a display 606 of an AR wearable device 602. An example of the presenting component 1612 is the UI module 638 and application 648 of FIG. 6.

The UI element execution component 1614 invokes the event 652 when the user 616 selects the UI element 646. An example of the UI element execution component 1614 is application 648 of FIG. 6. The scan state 624 and other data may be in the memory associated with the processor 1602. As illustrated, the processor 1602 is communicatively coupled to both the processor 1606 and the processor 1608. Additionally, the processor 1602 may be communicatively coupled to a communications component that provides wireless communication to other devices such as the application servers 114 and the voice input system 216.

Glossary

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, an AR glasses, a VR glasses, an AR wearable device, a desktop computer, a laptop, a portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed on an augmented reality (AR), mixed reality (MR), or virtual reality (VR) wearable device, the method comprising:
    sending a notification to an application that voice user interface (UI) mode is enabled;
    receiving, from the application, an indication of a UI element, the UI element indicating a tag and a UI element type;
    retrieving an action based on the UI element type from a data structure associating actions with UI element types;
    causing to be displayed on a display of the AR, MR, or VR wearable device, a voice UI label for the UI element, the voice UI label comprising the action and the tag;
    accessing audio data captured from a microphone of the AR, MR, or VR wearable device, the audio data generated by utterances of a user;
    processing the audio data to determine that the audio data comprises the action and the tag; and
    sending, to the application, an indication that the UI element is activated.

2. The method of claim 1 wherein the UI element type is one of a button, a slider, a text field, a check box, or an option group, wherein the tag is text.

3. The method of claim 1 wherein the tag is a first tag, the UI element type is a first UI element type, the UI element is a first UI element, the audio data is first audio data, the utterances are first utterances, and wherein the method further comprises:
    determining a second tag and a second UI element type for a second UI element displayed on the display by a legacy application;
    associating the second tag with a second action corresponding to the second UI element type;
    capturing, from a microphone of the AR, MR, or VR wearable device, second audio data, the second audio data generated by second utterances of the user;
    processing the second audio data to determine that the second audio data comprises the second action and the second tag; and
    sending, to the legacy application, a second indication that the second UI element is activated.

4. The method of claim 1 wherein the audio data is first audio data and wherein the method further comprises:
    capturing, from the microphone, second audio data, the second audio data generated by utterances of the user;
    processing the second audio data to determine the second audio data indicates a command to enable the voice UI mode; and
    enabling the voice UI mode.

5. The method of claim 4 wherein the second audio data is processed with a first machine learning model and the first audio data is processed by a second machine learning model.

6. The method of claim 1 wherein the voice UI label further comprises: tags of selection buttons, the UI element comprising the selection buttons.

7. The method of claim 1 further comprising:
    displaying, on the display of the AR, MR, or VR wearable device, an icon to indicate that the user is to speak the voice UI label to select the UI element.

8. The method of claim 1 further comprising:
    after the sending, disabling the voice UI mode; and
    removing the voice UI label for the UI element.

9. The method of claim 1 wherein the processing the audio data further comprises:
    sending the audio data to a host computer with an instruction to process the audio data; and
    receiving a transcription of the audio data from the host computer.

10. The method of claim 1 wherein the processing further comprising:
    processing, using a first neural network trained to recognize the actions, a first portion of the audio data to determine the audio data comprises the action; and
    processing, using a machine learning model, a second portion of the audio data to determine the audio data comprises the tag.

11. The method of claim 1 wherein the audio data is first audio data, and wherein the method further comprises:
    receiving, from the application, indications of UI elements, the UI elements indicating tags and UI element types;
    associating the tags with actions corresponding to the UI element types;
    capturing, from a microphone of the AR, MR, or VR wearable device, second audio data, the second audio data generated by utterances of the user;
    processing the second audio data to generate a transcription of the audio data;
    matching the tags and actions with the transcription; and
    in response to multiple tags and actions matching the transcription, displaying on the display for each of the multiple tags and actions an indication of what the user should say to select a UI element corresponding to a tag and an action of the multiple tags and actions.

12. The method of claim 1 further comprising:
    performing an event associated with the UI element.

13. The method of claim 1 further comprising:
    receiving, from the application, indications of UI elements; and
    sending, to the application, predetermined actions corresponding to the UI elements.

14. The method of claim 1 wherein causing to be displayed on a display of the AR, MR, or VR wearable device further comprises:
    causing to be displayed, adjacent to the display of the UI element, on the display, of the AR, MR, or VR wearable device, the voice UI label for the UI element, the voice UI label comprising the action and the tag.

15. The method of claim 14 wherein the application caused the display of the UI element.

16. An augmented reality (AR), mixed reality (MR), or virtual reality (VR) wearable device comprising:
    one or more processors; and
    a memory storing instructions that, when executed by the one or more processors, configure the AR wearable device to perform operations comprising:

sending a notification to an application that voice user interface (UI) mode is enabled;
receiving, from the application, an indication of a UI element, the UI element indicating a tag and a UI element type;
retrieving an action based on the UI element type from a data structure associating actions with UI element types;
causing to be displayed on a display of the AR, MR, or VR wearable device, a voice UI label for the UI element, the voice UI label comprising the action and the tag;
accessing audio data captured, from a microphone of the AR, MR, or VR wearable device, the audio data generated by utterances of a user;
processing the audio data to determine that the audio data comprises the action and the tag; and
sending, to the application, an indication that the UI element is activated.

17. The AR, MR, or VR wearable device of claim 16 wherein the audio data is first audio data and wherein the operations further comprise:
capturing, from the microphone, second audio data, the second audio data generated by utterances of the user;
processing the second audio data to determine the second audio data indicates a command to enable the voice UI mode; and
enabling the voice UI mode.

18. A non-transitory computer-readable storage medium, the computer-readable storage medium including instructions that when executed by an augmented reality (AR), mixed reality (MR), or virtual reality (VR) wearable device, cause the AR, MR, or VR wearable device to perform operations comprising:
sending a notification to an application that voice user interface (UI) mode is enabled;
receiving, from the application, an indication of a UI element, the UI element indicating a tag and a UI element type;
retrieving an action based on the UI element type from a data structure associating actions with UI element types;
causing to be displayed on a display of the AR, MR, or VR wearable device, a voice UI label for the UI element, the voice UI label comprising the action and the tag;
accessing audio data captured, from a microphone of the AR, MR, or VR wearable device, the audio data generated by utterances of a user;
processing the audio data to determine that the audio data comprises the action and the tag; and
sending, to the application, an indication that the UI element is activated.

* * * * *